(12) United States Patent
Young et al.

(10) Patent No.: US 11,752,934 B1
(45) Date of Patent: Sep. 12, 2023

(54) ACCENT LIGHTING SYSTEMS FOR VEHICLES

(71) Applicant: Nissan North America, Inc., Franklin, TN (US)

(72) Inventors: Steven Young, Ypsilanti, MI (US); Nelson Phan, Rochester Hills, MI (US); John Adams, Pinehurst, NC (US); Jason Gossiaux, Leander, TX (US); Mangesh Vinayak Soman, South Lyon, MI (US); Doug Kline, Warren, MI (US); Jonathan Grasso, Clinton Township, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/976,322

(22) Filed: Oct. 28, 2022

(51) Int. Cl.
| | |
|---|---|
| *B60Q 3/225* | (2017.01) |
| *F21V 3/00* | (2015.01) |
| *H02J 50/10* | (2016.01) |
| *F21Y 115/10* | (2016.01) |
| *F21W 106/00* | (2018.01) |

(52) U.S. Cl.
CPC .............. *B60Q 3/229* (2022.05); *F21V 3/00* (2013.01); *H02J 50/10* (2016.02); *F21W 2106/00* (2018.01); *F21Y 2115/10* (2016.08)

(58) Field of Classification Search
CPC ................................ B60Q 3/229; H02J 50/10
See application file for complete search history.

(56) References Cited

U.S. PATENT DOCUMENTS

| | | | |
|---|---|---|---|
| 10,173,571 B2 | 1/2019 | Park et al. | |
| 10,386,566 B2* | 8/2019 | Ueno | A47G 23/0309 |
| 2015/0042223 A1* | 2/2015 | Harrington | B63B 45/00 315/70 |
| 2015/0136932 A1* | 5/2015 | Salter | B60Q 3/225 248/346.05 |
| 2016/0344221 A1* | 11/2016 | Kramer | H02J 7/0044 |
| 2020/0036228 A1* | 1/2020 | Simpson | H02J 50/10 |
| 2021/0094455 A1* | 4/2021 | Vite Cadena | B60N 3/103 |

FOREIGN PATENT DOCUMENTS

| | | |
|---|---|---|
| CN | 104930409 A | 9/2015 |
| CN | 105263752 B | 10/2018 |

* cited by examiner

*Primary Examiner* — Christopher E Dunay
(74) *Attorney, Agent, or Firm* — Young Basile Hanlon & MacFarlane, P.C.

(57) ABSTRACT

An accent lighting system for a vehicle is disclosed that includes a light module and a transmitter. The light module includes a first inductive member and a diffuser that extends along a periphery of the light module so as to collect and distribute light generated by the light module. The transmitter includes a second inductive member that is configured for electromagnetic communication with the first inductive member so as to create current in the first inductive member and thereby power the light module.

20 Claims, 6 Drawing Sheets

ACCENT LIGHTING SYSTEMS FOR VEHICLES

TECHNICAL FIELD

The present disclosure relates to accent lighting in vehicles and, more specifically, to an accent lighting system including a light module that is powered via electromagnetic induction.

BACKGROUND

Accent lighting is commonly used in vehicles to change and/or improve the overall aesthetic appearance of the passenger compartment. Known accent lighting systems, however, typically require a wired connection between the light source and a power source in the vehicle, which complicates installation in that it requires the formation of one or more penetrations (e.g., openings, holes, etc.) to route the necessary wiring. In the context of a lighted cupholder in particular, such penetrations are problematic in that they create pathways for fluid to enter inner, generally inaccessible areas of the vehicle, such as the space beneath the console, in the event of a spill.

The present disclosure addresses these concerns by providing an accent lighting system that is powered via electromagnetic induction, which eliminates (obviates) the need to create penetrations at the installation site in the vehicle.

SUMMARY

In one aspect of the present disclosure, an accent lighting system for a vehicle is disclosed. The accent lighting system includes: a light module that is configured for insertion into a cupholder in the vehicle; a transmitter; and a control module.

The light module includes: a housing that defines an internal chamber; a first inductive coil that is located within the internal chamber; a printed circuit board assembly that includes a plurality of light sources and which is in electrical communication with the first inductive coil such that the first inductive coil delivers power to the plurality of light sources; a diffuser that extends along an outer perimeter of the housing and which includes one or more light-permeable materials so as to allow light emitted from the plurality of light sources to pass therethrough; and a cover that overlies the printed circuit board assembly.

The transmitter includes a second inductive coil that is configured for electromagnetic communication with the first inductive coil such that the second inductive coil wirelessly delivers power to the first inductive coil, thereby obviating any need for penetrations in the cupholder to establish electrical communication between the transmitter and the light module so as to inhibit any fluid leakage from the cupholder.

The control module is positioned between the transmitter and a power source in the vehicle such that power flows from the power source to the transmitter through the control module, whereby the first inductive coil and the second inductive coil create current in the light module via electromagnetic induction to thereby energize the plurality of light sources and illuminate the light module and the cupholder.

In certain embodiments, the housing may include a recess defining a shoulder that is configured to support the cover such that the diffuser is positioned radially outward thereof.

In certain embodiments, the plurality of light sources may be secured to the printed circuit board assembly.

In certain embodiments, the plurality of light sources may be spaced radially inward from the diffuser to inhibit visual perception of the plurality of light sources.

In certain embodiments, the accent lighting system may further include an adhesive member that is positioned between the housing and the printed circuit board assembly.

In certain embodiments, the adhesive member may define a receptacle that is configured to receive the first inductive coil such that the adhesive member inhibits relative movement between the housing, the first inductive coil, and the printed circuit board assembly.

In another aspect of the present disclosure, an accent lighting system for a vehicle is disclosed that includes a light module and a transmitter. The light module includes a first inductive member and a diffuser that extends along a periphery of the light module so as to collect and distribute light generated by the light module. The transmitter includes a second inductive member that is configured for electromagnetic communication with the first inductive member so as to create current in the first inductive member and thereby power the light module.

In certain embodiments, the light module may be configured for insertion into a cupholder in the vehicle.

In certain embodiments, the light module may include at least one light source that is in electrical communication with the first inductive member.

In certain embodiments, the at least one light source may include an array of LEDs.

In certain embodiments, the accent lighting system may further include a printed circuit board assembly that is in electrical communication with the first inductive member.

In certain embodiments, the printed circuit board assembly may include the at least one light source.

In certain embodiments, the printed circuit board assembly may overlie the first inductive member.

In certain embodiments, the accent lighting system may further include an adhesive member defining a receptacle that is configured to receive the first inductive member such that the first inductive member is positioned within the adhesive member.

In certain embodiments, the accent lighting system may further include a housing defining an internal chamber that is configured to receive the adhesive member, the first inductive member, the printed circuit board assembly, and the at least one light source.

In certain embodiments, the adhesive member may be positioned between the housing and the printed circuit board assembly to inhibit relative movement between the housing, the first inductive member, the printed circuit board assembly, and the at least one light source.

In certain embodiments, the diffuser may be a component of the housing.

In certain embodiments, the diffuser may be formed integrally with the housing.

In another aspect of the present disclosure, an accent lighting system for a vehicle is disclosed. The accent lighting system includes: a light module that is configured for insertion into a cupholder in the vehicle; a transmitter that is configured for wireless communication with the light module such that the transmitter is locatable externally of the cupholder; and a control module.

The light module and the transmitter each include an inductive member such that, upon receiving power from a power source in the vehicle, the transmitter creates current in the light module via electromagnetic induction to thereby power the light module and illuminate the cupholder.

The control module is in electrical communication with the transmitter and the power source such that power flows from the power source to the transmitter through the control module, and is configured to communicate signals to the light module via the transmitter to vary operation of the light module.

In certain embodiments, the light module may include a diffuser that defines an outer contour corresponding to an inner contour of the cupholder In certain embodiments, the diffuser may extend about a periphery of the light module.

In certain embodiments, the light module may include at least one light source that is positioned radially inward of the diffuser.

In certain embodiments, the diffuser may include a light-permeable material such that the diffuser collects and distributes light generated by the at least one light source.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes accent lighting systems for vehicles that are powered via electromagnetic induction, which eliminates (obviates) the need to create any penetrations (e.g., openings, holes, etc.) during installation so as not to form any pathways at the installation site that might otherwise allow to fluid to enter (generally) inaccessible areas of the vehicle (e.g., in the event of a spill). More specifically, the lighting systems described herein include a light module and a transmitter with corresponding inductive members (e.g., coils) that create an induced magnetic field upon receiving current from a power source in the vehicle so as to wirelessly power the light module.

While generally described in the context of cupholders that are located in the center console of the vehicle, it should be appreciated that the principles, components, and methods described herein are applicable to a wide variety of installation sites.

Figure 1:
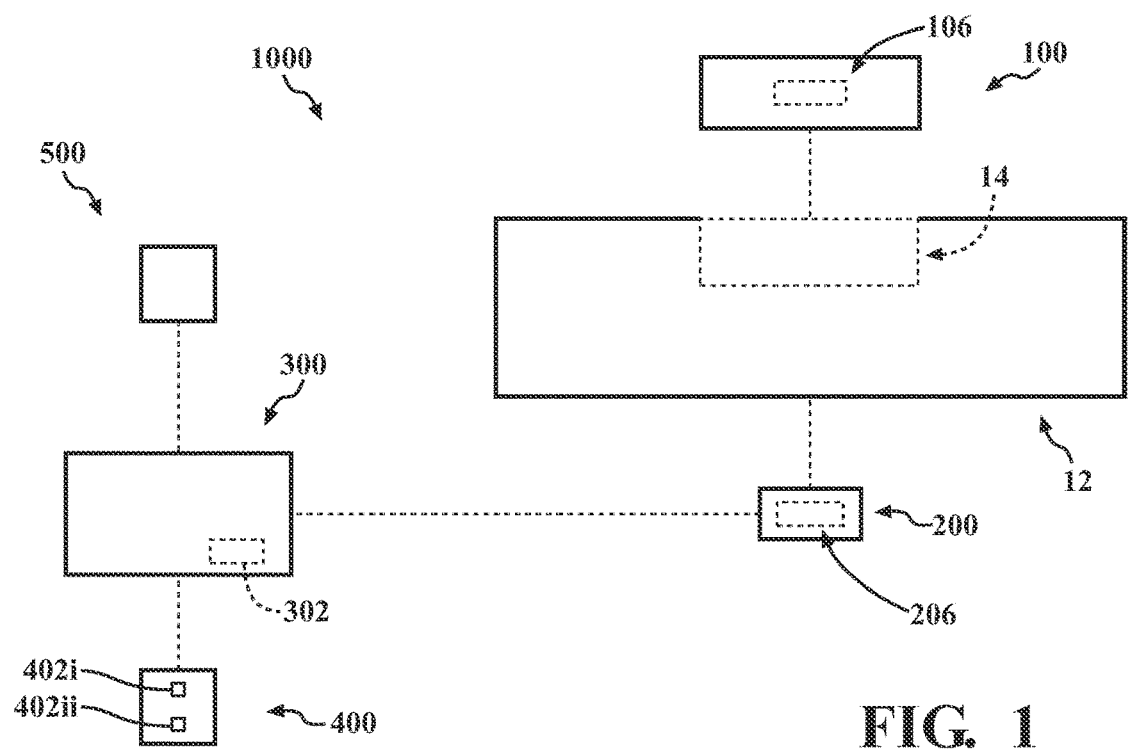
FIG. 1 is a schematic illustration of an accent lighting system for a vehicle according to the principles of the present disclosure, which includes: a light module; a transmitter; a control module; and a switch.
Figure 2:
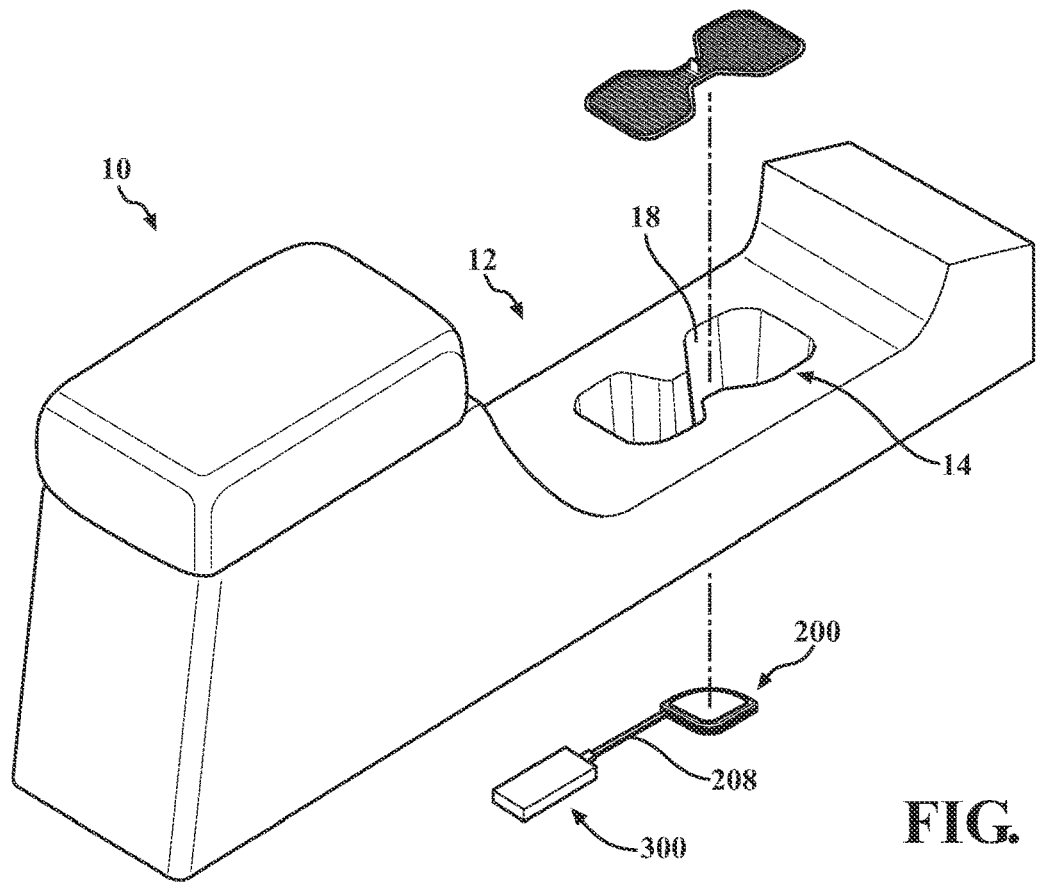
FIG. 2 is a top, perspective view of one embodiment of the transmitter and the light module seen in FIG. 1 in which the light module is configured for insertion into a cupholder in a console of the vehicle.
Figure 3:
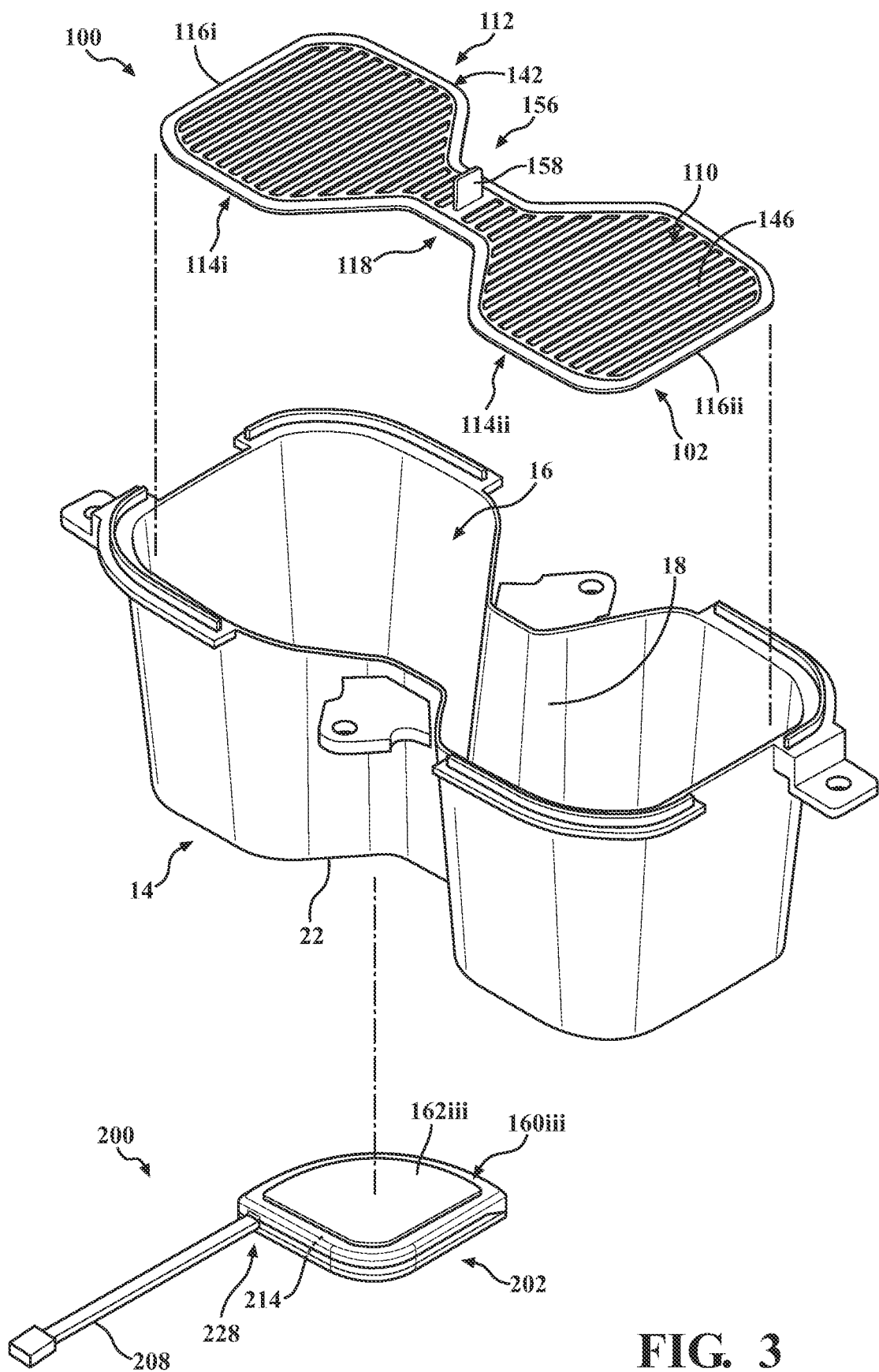
FIG. 3 is a top, perspective view of the transmitter and the light module seen in FIG. 2 shown with the cupholder.

With reference to FIGS. 1-3, an accent lighting system 1000 for a vehicle 10 (FIG. 9) is disclosed that includes: a light module (receiver) 100; a transmitter 200; a control module 300; and a switch 400. Although generally illustrated and described in the context of a passenger vehicle, it should be appreciated that the lighting system described herein may be configured for use with a wide variety of vehicles including trucks, SUVs, vans, buses, boats, airplanes, trains, etc.

In the particular embodiment illustrated, the accent lighting system 1000 is associated with a (center) console 12 of the vehicle 10 and, more specifically, is configured to illuminate one or more cupholders 14 in the console 12. It should be appreciated, however, that the accent lighting system 1000 may be configured for use in a wide variety of locations within the vehicle 10. For example, it is envisioned that the accent lighting system 1000 may be configured to illuminate a glove box or other such storage compartment in the vehicle 10, one or more seats in passenger compartment, visors, door trim, etc.

Referring now to FIGS. 4-7 as well, the light module 100 includes: a (first) housing 102 with a diffuser 104; a (first) inductive member (coil) 106; a (first) printed circuit board assembly (PCBA) 108; and a cover 110. The light module 100 is configured for removable insertion into the cupholder(s) 14 (FIGS. 1-3) and defines an outer contour (profile) 112 (FIG. 3) that corresponds to (e.g., (substantially) approximates, matches, mirrors) an inner contour (profile) 16 defined by the cupholder(s) 14. In the particular embodiment illustrated, the light module 100 and the cupholder(s) 14 each include a modified lemniscate configuration. More specifically, the light module 100 includes (first and second) nodes 114i, 114ii having (generally) planar opposing ends 116i, 116ii, respectively, that are connected by a (generally) linear bridge portion 118. It should be appreciated, however, the particular configuration of the light module 100 may be altered in various embodiments without departing from the scope of the present disclosure (e.g., depending upon the particular configuration of the cupholder(s) 14). For example, embodiments of the light module 100 including nodes 114 with (generally) annular (e.g., circular) cross-sectional configurations are envisioned herein. Additionally, depending upon the particular configuration of the cupholder(s) 14, it is envisioned that the number of nodes 114 may be increased or decreased. As such, embodiments of the light module 100 including a single node 114 (and devoid of the bridge portion 118) are also envisioned herein, as are embodiments including three or more nodes 114, and would not be beyond the scope of the present disclosure.

The corresponding contours (configurations) defined by the light module 100 and the cupholder(s) 14 allows the light module 100 to be received by and retained within the cupholder(s) 14 without any fixed connection therebetween, as described in further detail below. Embodiments of the disclosure in which the light module 100 may be (mechanically) connected to the cupholder(s) 14, however, are envisioned herein and would not be beyond the scope of the present disclosure. For example, it is envisioned that the light module 100 and the cupholder(s) 14 may be connected together in an interference (pressure, snap) fit arrangement, via one or more mechanical fasteners, via an adhesive, etc.

The housing 102 defines an internal chamber 120 (FIGS. 4-6), which is configured to receive the inductive member 106 and the PCBA 108, and a recess 122 that defines a shoulder 124, which is configured to receive (support) the cover 110. More specifically, the housing 102 supports the cover 110 such that the diffuser 104 is positioned radially outward thereof and such that the cover 110 overlies (conceals) the PCBA 108 and the inductive member 106.

Figure 7:
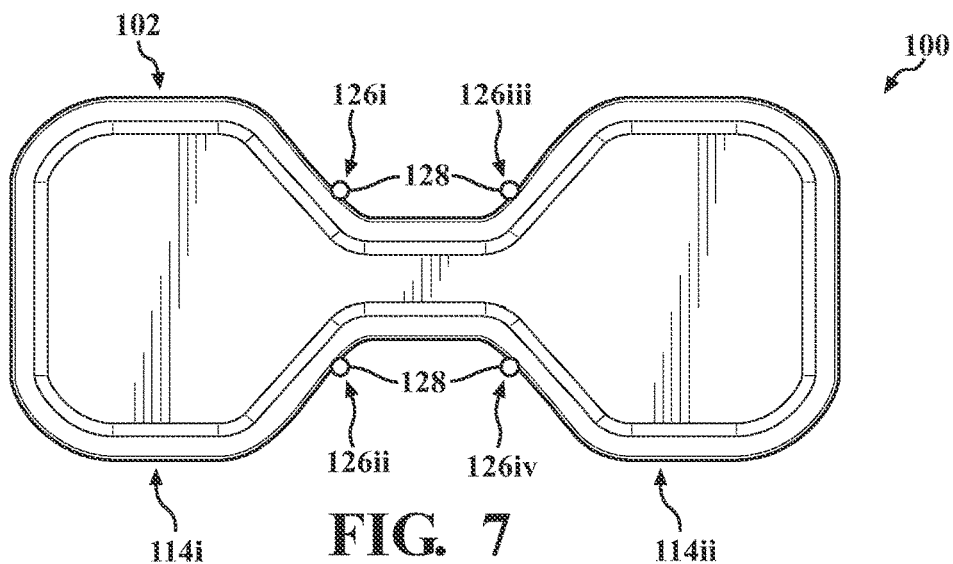
FIG. 7 is a bottom, plan view of one embodiment of the light module seen in FIG. 2, which includes a plurality of location members to restrict movement of the light module within the cupholder.

With specific reference to FIG. 7, in the particular embodiment illustrated, the housing 102 includes one or more location members 126 (e.g., detents 128) that are configured for engagement (contact) with an inner surface 18 (FIGS. 2, 3) of the cupholder(s) 14 so as to inhibit (if not entirely prevent) unintended movement of the light module 100 within the cupholder(s) 14 and thereby reduce (if not entirely eliminate) rattle, etc. The location member(s) 126 thus eliminate the need for any fixed (e.g., mechanical, adhesive) connection between the housing 102 and the cupholder(s) 14, which allows for repeated insertion and removal of the light module 100 (e.g., to facilitate repair, maintenance, or replacement thereof, cleaning of the cupholder(s) 14, etc.). The absence of any fixed connection between the light module 100 and the cupholder(s) 14 eliminates (obviates) any need to create or form any penetrations at the installation site (e.g., drill holes or otherwise form openings in the cupholder(s) 14), which not only simplifies installation, but prevents the creation of any pathways that might otherwise allow fluid to enter (generally) inaccessible areas of the vehicle 10 (e.g., the spaces beneath and/or internal to the console 12) and, thus, inhibits (if not entirely prevents) any fluid leakage from the cupholder(s) 14 (e.g., in the event of a spill).

In the particular embodiment illustrated, the housing 102 includes four location members 126*i*-126*iv*. More specifically, the locations members 126*i*, 126*ii* extend from (are connected to or otherwise associated with) the node 114*i* and the location members 126*iii*, 126*iv* extend from (are connected to or otherwise associated with) the node 114*ii*. It should be appreciated, however, the particular number of location members 126 may be increased or decreased in various embodiments without departing from the scope of the present disclosure (e.g., depending upon the particular configuration of the cupholder(s) 14). As such, embodiments of the light module 100 including both fewer and greater numbers of location members 126 are envisioned herein, as are embodiments in which the location member(s) 126 may be omitted altogether.

The PCBA 108 (FIGS. 4, 5) is located between the housing 102 and the cover 110 and supports a plurality of electrical components that facilitate operation of the light module 100 in the manner described herein including, for example, one or more (e.g., a plurality of) light sources 130. The PCBA 108 is in electrical communication with the inductive member 106 such that current generated in the inductive member 106 is transmitted to the light source(s) 130 via the PCBA 108.

The light source(s) 130 may be configured and oriented to emit (direct) light in any direction or combination of directions. For example, it is envisioned that the light source(s) 130 may be configured to direct light vertically (e.g., towards the cover 110) and/or radially (e.g., towards the diffuser 104).

In the particular embodiment of the accent lighting system 1000 illustrated, the light source(s) 130 are configured to emit multi-colored light. Embodiments in which the light source(s) 130 may include a monochromatic configuration, however, are also envisioned herein and would not be beyond the scope of the present disclosure.

Figure 4:
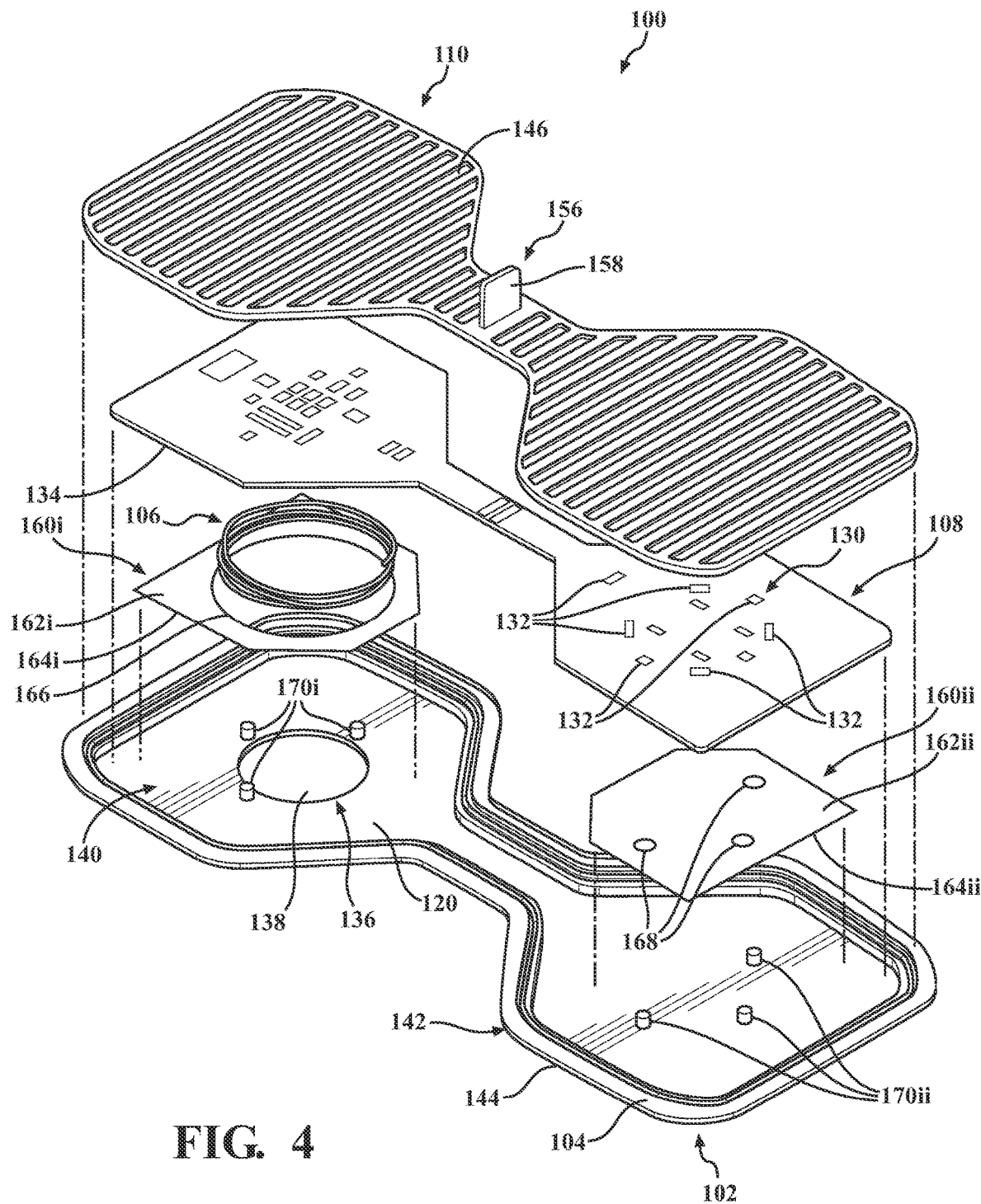
FIG. 4 is a top, perspective view of the light module seen in FIG. 2 shown with parts separated.
Figure 5:
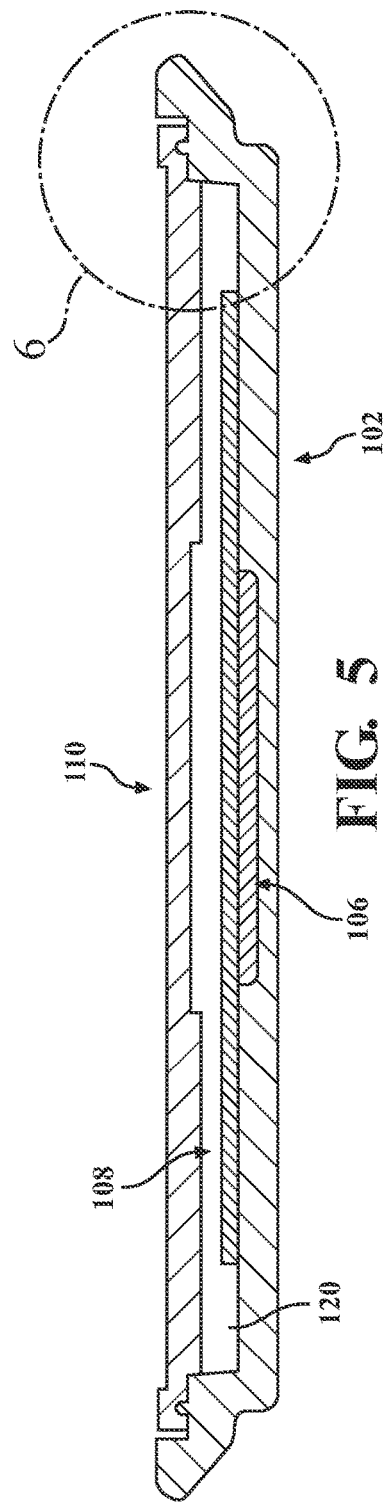
FIG. 5 is a (partial) longitudinal, cross-sectional view of the light module seen in FIG. 2.
Figure 6:
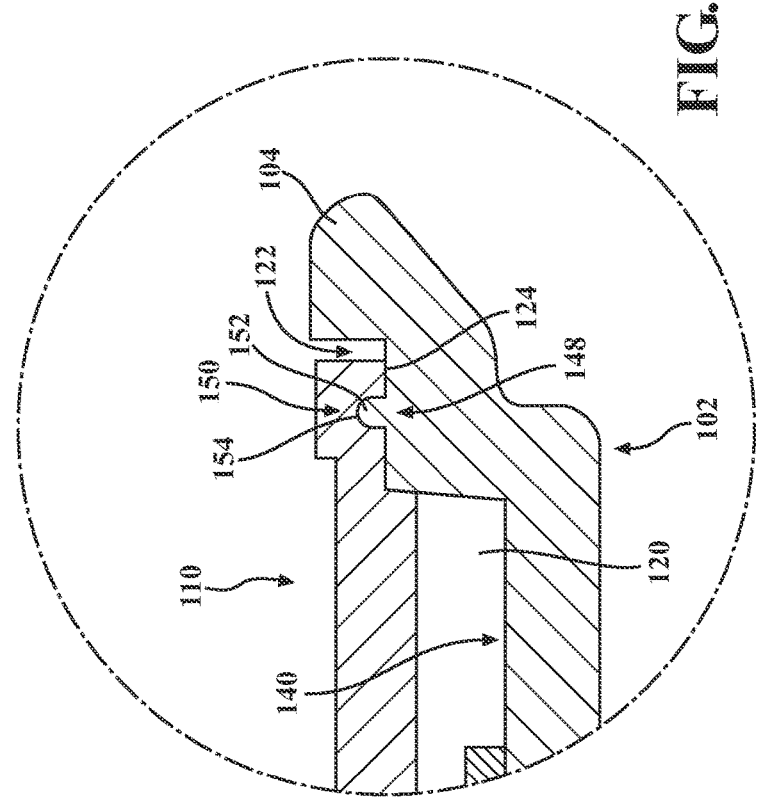
FIG. 6 is an enlargement of the area of detail identified in FIG. 5.

As seen in FIG. 4, the light source(s) 130 are secured (connected) to (or otherwise supported by) the PCBA 108 such that they are spaced radially inward from the diffuser 104. Spacing the light source(s) 130 radially inward of the diffuser 104 inhibits (if not entirely prevents) visual perception of the light source(s) 130 through the diffuser 104 and, thus, the appearance of hotspots or other such areas of increased brightness.

In the particular embodiment illustrated, the light sources 130 include an array of LEDs 132 that are supported by the PCBA 108 such that the light sources 130 are located within the node 114*ii* (FIG. 3). It should be appreciated, however, that the specific configuration (arrangement) of the light source(s) 130 may be altered in various embodiments without departing from the scope of the present disclosure (e.g., based upon the desired aesthetic appearance of the cupholder(s) 14 or other such installation site, electrical and/or power capabilities, etc.). For example, embodiments in which the light module 100 includes one or more light sources 130 that are supported by the PCBA 108 such that the light sources 130 are located within the node 114*i*, either in addition to or instead of the node 114*ii*, are also envisioned herein and would not be beyond the scope of the present disclosure.

In the particular embodiment illustrated, the inductive member 106 is secured (connected) to (or otherwise supported by) the PCBA 108, which facilitates the delivery of power from the inductive member 106 to the PCBA 108. More specifically, the inductive member 106 is secured to a lower (bottom) surface 134 of the PCBA 108 such that the PCBA 108 overlies the inductive member 106, which facilitates positioning of the inductive member 106 within a seat 136 (e.g., an indentation 138, a depression, etc.) formed in a floor 140 of the housing 102. Positioning of the inductive member 106 within the seat 136 inhibits (if not entirely prevents) unintended relative movement between the various components of the light module 100 (e.g., the housing 102, the inductive member 106, the PCBA 108, etc.), thereby protecting the inductive member 106 from damage during installation, removal, and/or use of the light module 100.

The diffuser 104 extends along (about) an (outer) periphery 142 of the light module 100 (e.g., an outer perimeter 144 of the housing 102) and defines an outer contour (profile) that corresponds to (e.g., (substantially) approximates, matches, mirrors) an inner contour (profile) defined by the cupholder(s) 14. The diffuser 104 is configured to collect and disperse (distribute) light generated (emitted) by the light module 100 (e.g., by the light source(s) 130) in a plurality of directions and may include (e.g., may be formed partially or entirely from) any material or combination of materials suitable for that intended purpose. More specifically, in the particular embodiment illustrated, the diffuser 104 includes one or more light-permeable (e.g., translucent, semi-transparent, or transparent) materials, which allows light generated (emitted) by the light source(s) 130 to pass therethrough and emanate from the light module 100 to thereby illuminate the cupholder(s) 14, the console 12, and the interior of the vehicle 10. The dispersion (distribution, spreading) of light facilitated by the diffuser 104 not only allows for a reduction in the number of light sources 130, but increases uniformity in the overall (aesthetic) appearance of the lighting assembly 10 by further reducing (if not entirely eliminating) the formation and perception of hotspots or other such areas of increased brightness.

In the particular embodiment illustrated, the diffuser 104 is configured as a component of the housing 102 and is formed integrally (e.g., unitarily, monolithically) therewith. Embodiments in which the housing 102 and the diffuser 104 may be configured as separate, discrete components of the light module 100 are also envisioned herein, however, and would not be beyond the scope of the present disclosure. In such embodiments, it is envisioned that the housing 102 and the diffuser 104 may be connected together in any suitable manner including, for example, via one or more mechanical fasteners (e.g., one or more bolts, screws, rivets, pins, clips, or the like), via ultrasonic welding, via an adhesive, etc.

The cover 110 is configured as a mat 146 that conceals and protects the internal components of the light module 100 (e.g., the inductive member 106, the PCBA 108, the light source(s) 130, etc.) and is configured to support one or more containers (not shown) upon insertion into the cupholder(s) 14. The cover 110 may include any suitable material or combination of materials such as, for example, one or more plastic materials (e.g., silicone), one or more polymeric materials, one or more composite materials, etc. Although shown as including a (generally) opaque configuration in the particular embodiment illustrated, in certain embodiments, it is envisioned that the cover 110 may include one or more light-permeable materials to allow the light generated (emitted) by the light source(s) 130 to exit the light module through the cover 110 (in addition to the diffuser 104).

As indicated above, the cover 110 is supported by the shoulder 124 (FIG. 6) defined by the recess 122 in the housing 102 such that the diffuser 104 is positioned radially outward of the cover 110, which suspends and (vertically) separates (spaced) the cover 110 from the floor 140 of the housing 102. Separating the cover 110 from the floor 140 of the housing 102 allows the internal chamber 120 (FIGS. 4-6) to fill with light generated (emitted) by the light source(s) 130 (FIG. 4) such that the light is directed (radially) outward through the diffuser 104 to thereby illuminate the installation site (e.g., the cupholder(s) 14).

In the particular embodiment illustrated, the housing 102 and the cover 110 include corresponding retainers 148, 150, respectively, that are configured for (releasable) engagement so as to inhibit (if not entirely prevent) unintended movement between the housing 102 and the cover 110. More specifically, the housing 102 includes one or more projections 152 (e.g., detents, ribs, etc.) that are configured for reception by one or more corresponding notches 154 (e.g., indentations, slots, etc.) that are defined by the cover 110. Embodiments in which the locations of the projection(s) 152 and the notch(es) 154 may be reversed (e.g., such that the projection(s) 152 are included on the cover 110 and the notch(es) 154 are included on the housing 102) are also envisioned herein, however, as are embodiments in which the retainers 148, 150 may be omitted altogether.

In order to facilitate insertion and removal of the light module 100, in certain embodiments, such as that seen throughout the figures, it is envisioned that the cover 110 may include a tactile member 156 (e.g., a tab 158) (FIGS. 3, 4) that is configured for manual engagement by a user. Embodiments devoid of the tactile member 156, however, are also envisioned herein and would not be beyond the scope of the present disclosure.

Figure 8:
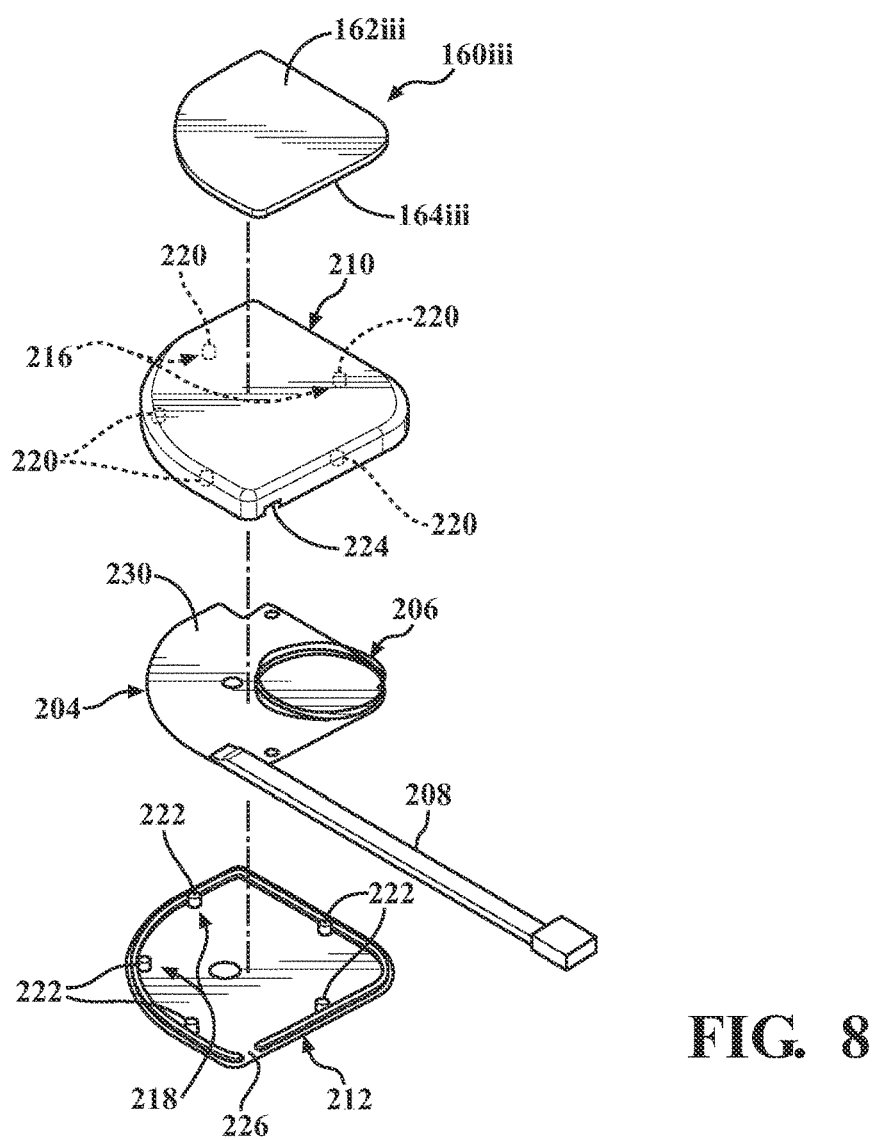
FIG. 8 is a top, perspective view of the transmitter seen in FIG. 2 shown with parts separated.

In certain embodiments, such as that illustrated throughout the figures, the light module 100 may further includes one or more adhesive member(s) 160 (FIGS. 3, 4, 8). The adhesive member(s) 160 are located within the internal chamber 120 (FIGS. 4-6) and are configured to secure one or more components of the light module 100 in relation to each other. In the particular embodiments illustrated, for example, the light module 100 includes (first and second) adhesive members 160*i*, 160*ii* that are positioned between the housing 102 and the PCBA 108. More specifically, the adhesive members 160*i*, 160*ii* are located (positioned) within the nodes 114*i*, 114*ii* (FIG. 3) and include adhesive upper (top) surfaces 162*i*, 162*ii* and adhesive lower (bottom) surfaces 164*i*, 164*ii*, respectively, whereby the adhesive members 160*i*, 160*ii* inhibit, if not entirely prevent, relative movement between the housing 102, the inductive member 106, and the PCBA 108. While the adhesive members 160*i*, 160*ii* are shown as discrete components of the light module 100, embodiments are also envisioned in which the adhesive members 160*i*, 160*ii* may be integrally (e.g., unitarily, monolithically) formed.

Although the light module 100 is shown as including a pair of adhesive members 160 in the particular embodiment illustrated, it should be appreciated that the particular number of adhesive members 160 may be increased or decreased in various embodiments without departing from the scope of the present disclosure (e.g., depending upon the particular configuration of the housing 102, the PCBA 108, etc.). As such, embodiments of the light module 100 including both fewer and greater numbers of adhesive members 160 are envisioned herein, as are embodiments in which the adhesive member(s) 160 may be omitted altogether.

As seen in FIG. 4, in the particular embodiment illustrated, the adhesive members 160*i*, 160*ii* include non-identical configurations, which is dictated, for example, by the configuration of the housing 102, the configuration of the inductive member 106, the location of the inductive member 106, etc. More specifically, the adhesive member 160*i* includes a receptacle 166, and the adhesive member 160*ii* defines one or more openings 168.

The receptacle 166 defined by the adhesive member 160*i* is configured to receive the inductive member 106 as well as one or more bosses (standoffs) 170*i* that extend (vertically) from the housing 102 (within the node 114*i* (FIG. 3)). Upon assembly of the light module 100, the inductive member 106 is thus positioned within the adhesive member 160*i* (e.g., such that the adhesive member 160*i* circumscribes (extends about) the inductive member 106). Reception of the inductive member 106 and the boss(es) 170*i* by the adhesive member 160*i* (e.g., the receptacle 166) further inhibits (if not entirely prevents) unintended relative movement between the housing 102, the adhesive member 160*i*, the inductive member 106, and the PCBA 108.

The openings 168 defined by the adhesive member 160*ii* are configured to receive one or more bosses (standoffs) 170*ii* that extend (vertically) from the housing 102 (within the node 114*ii* (FIG. 3)). Reception of the boss(es) 170*ii* by the adhesive member 160*ii* (e.g., the openings 168) inhibits (if not entirely prevents) unintended relative movement between housing 102, the adhesive member 160*ii*, the inductive member 106, and the PCBA 108.

With reference now to FIGS. 3 and 8 in particular, the transmitter 200 includes a (second) housing 202; a (second) PCBA 204; a (second) inductive member (coil) 206; and a connector 208 (e.g., a coaxial cable, a flexible printed circuit, etc.). As described in further detail below, the transmitter 200 is configured for wireless communication with the light module 100 via electromagnetic induction, whereby power (and data) is delivered from the transmitter 200 to the light module 100, which eliminates the need for any physical connection between the light module 100 and the transmitter 200.

The housing 102 includes (first, top and second, bottom) upper and lower housing portions 210, 212, respectively, that collectively define a cavity 214, which is configured to receive (accommodate) the PCBA 204 and the inductive member 206. The housing portions 210, 212 may be configured for engagement (connection) in any suitable manner, whether releasable or non-releasable (e.g., fixed). For example, it is envisioned that the housing portions 210, 212 may be connected via mechanical fasteners (e.g., one or more bolts, screws, rivets, pins, clips, or the like), in an interference (pressure, snap) fit arrangement, via ultrasonic welding, via an adhesive, etc. In the particular embodiment illustrated, for example, the housing portions 210, 212 respectively include corresponding engagement members 216, 218 that are configured for (releasable) engagement. More specifically, the housing portion 210 includes one or more receptacles 220 that are configured to receive one or more detents (bosses) 222 that extend (vertically) from the housing portion 212. Embodiments in which the locations of the receptacle(s) 220 and the detent(s) 222 may be reversed (e.g., such that the receptacle(s) 220 are included on the housing portion 212 and the detent(s) 222 are included on the housing portion 210) are also envisioned herein, however, and would not be beyond the scope of the present disclosure.

The housing portions 210, 212 include respective corresponding notches 224, 226 that collectively define a window 228. The window 228 is configured to receive the connector 208 such that the connector 208 extends from the PCBA 204 externally of the housing 202 so as to allow for connection of the transmitter 200 to the control module 300.

The PCBA 204 is located between the housing portions 210, 212 within the cavity 214 and supports a plurality of electrical components that facilitate operation of the transmitter 200 in the manner described herein including. For example, as seen in FIG. 8, the PCBA 204 supports the inductive member 206 on an upper (top) surface 230 thereof, whereby the inductive member 206 is also located within the cavity 214, such that electrical signals are delivered from the control module 300 to the inductive member 206 via the PCBA 204.

The inductive members 106, 206 (FIGS. 4, 8) are configured for electromagnetic communication to wirelessly deliver power and data therebetween. More specifically, in the particular embodiment of the accent lighting system 1000 illustrated, upon receiving an electrical current, the inductive member 206 creates an induced electromagnetic field that generates an electrical current in the inductive member 106, whereby the inductive member 206 wirelessly delivers power and data to the inductive member 206 to power the light module 100 and illuminate the cupholder(s) 14. The strength of the induced electromagnetic field, and the current created in the inductive member 106, may be controlled or customized by altering one or more aspects of the inductive members 106, 206, including, for example, the number of turns in the coils thereof, the transverse (horizontal) cross-sectional dimensions (e.g., the diameters) of the inductive members 106, 206, the (vertical) cross-sectional thicknesses of the inductive members 106, 206, the material(s) from which the inductive members 106, 206 are formed, etc.

The transmitter 200 is located (positioned) externally of the cupholder(s) 14 and is configured for connection (securement) thereto. More specifically, in the particular embodiment of the accent lighting system 1000 illustrated, the transmitter 200 includes an adhesive member 160iii with an adhesive upper surface 162iii and an adhesive lower surface 164iii. The adhesive upper surface 162iii secures the adhesive member 160iii in relation to the cupholder(s) 14 and the adhesive lower surface 164iii secures the adhesive member 160iii in relation to the transmitter 200 via connection to the housing 102. The adhesive member 160iii thus (removably) connects the transmitter 200 to the cupholder(s) 14 so as to inhibit, if not entirely prevent, relative movement therebetween in a manner that further contributes to the elimination of any need to create or form any penetrations at the installation site, thus further simplifying installation and further preventing the creation of any pathways for fluid to inner, (generally) inaccessible areas of the vehicle 10 so as to further inhibit (if not entirely prevent) any fluid leakage from the cupholder(s) 14 (e.g., in the event of a spill). It should be appreciated, however, that the transmitter 200 may be connected to the cupholder(s) 14 in any manner suitable for this intended purpose. For example, in alternate embodiments of the disclosure, it is envisioned that the transmitter 200 may be connected to the cupholder(s) 14 via one or more suitable mechanical fasteners (e.g., one or more clips, etc.), in an interference (pressure, snap) fit arrangement, etc.

The control module 300 regulates and controls operation of the accent lighting system 1000 and delivers data and power to the transmitter 200. More specifically, the control module 300 is connected to, and is positioned (located) between, the transmitter 200 and a power source 500 in the vehicle 10, which may include an accessory service connector, a wiring harness, a battery in the vehicle 10, etc., so as to provide an electrical interface between the power source 500 and the transmitter 200. The electrical interface between the power source 500 and the transmitter 200 established by the control module 300 facilitates the delivery of power (e.g., alternating current) to the inductive member 206, whereby power flows from the power source 500 to the transmitter 200 through the control module 300 to thereby generate current in the inductive members 106, 206 (FIGS. 4, 8) via electromagnetic induction in the manner described above.

The control module 300 (FIGS. 1, 2) is configured to transmit a variety of signals to the transmitter 200, which are then (wirelessly) transmitted from the transmitter 200 to the light module 100 via the respective inductive members 206, 106 and the induced electromagnetic field discussed above to vary operation of the light module 100. For example, it is envisioned that the control module 300 may be configured to vary the color of the light emitted from the light source(s) 130, lighting cycles, lighting intervals, etc., by modulating pulse width (or in any other suitable manner). To facilitate such operation, it is envisioned that the control module 300 may include any suitable combination of electrical components such as, for example, one or more software-based, programmable processors 302 (FIG. 1).

Although shown as being located beneath the console 12 (FIG. 2) of the vehicle 10 in the particular embodiment illustrated, it should be appreciated that the control module 300 may be positioned in any suitable location in the vehicle 10 (e.g., in a dashboard 20 (FIG. 9), in a glove box, beneath a seat in the vehicle 10, etc.). As such, the present disclosure envisions a variety of embodiments in which the specific location of the control module 300 may be varied.

The switch 400 (FIG. 1) is connected to the control module 300 and provides a user interface for the accent lighting system 1000. The switch 400 includes one or more buttons 402 that support operation of the accent lighting system 1000 and control operation thereof. For example, in the particular embodiment illustrated, the switch 400 includes a (first) button 402i (e.g., a power button), which allows the accent lighting system 1000 to be turned on and off, and a (second) button 402ii (e.g., a mode button), which allows for operation of the lighting system 1000 in a variety of modes. For example, via the button 402ii, it is envisioned that the color of the light emitted from the light source(s) 130 may be varied as well as the lighting cycles, lighting intervals, etc.

Figure 9:
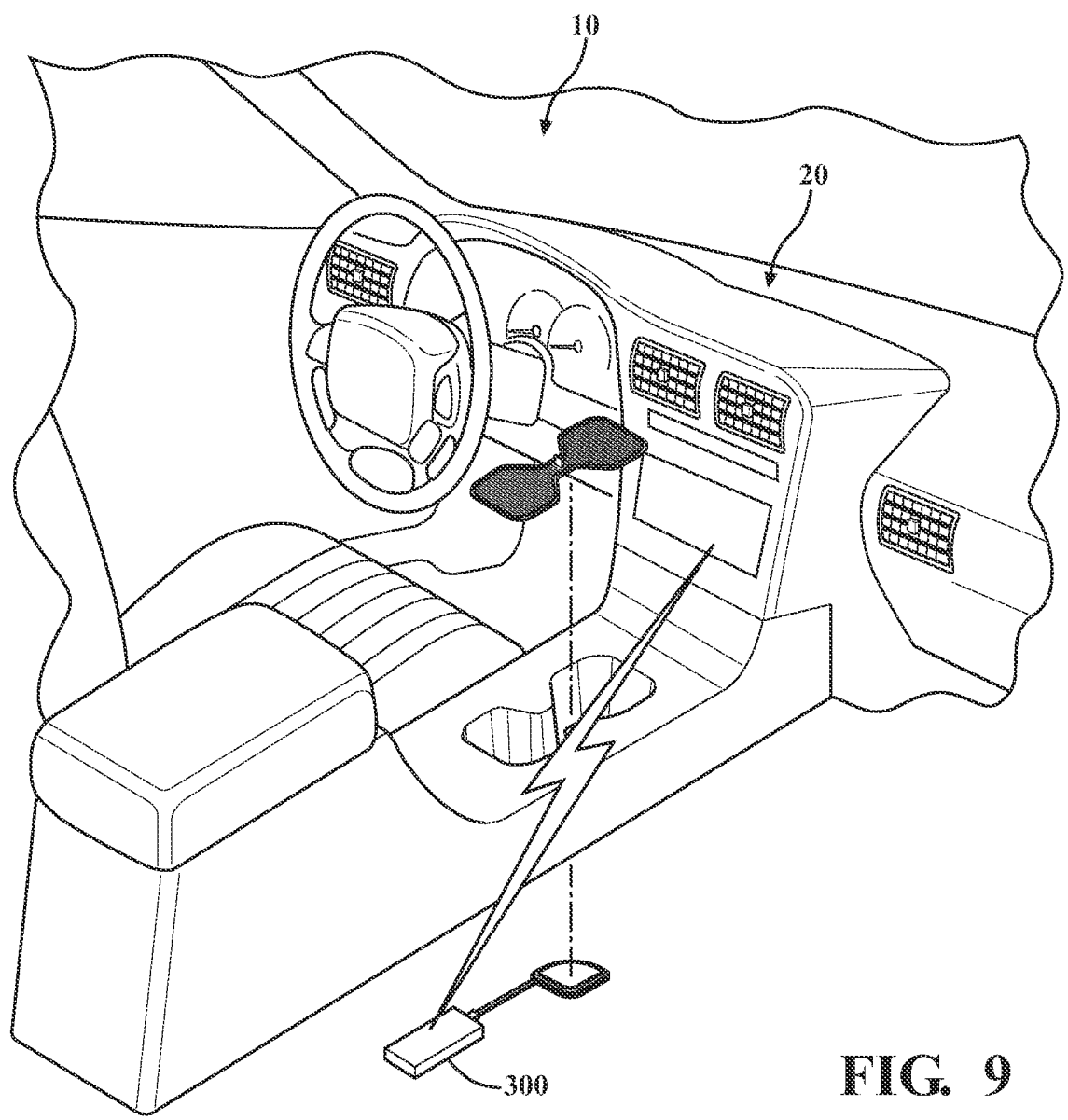
FIG. 9 is a top, perspective view of an alternate embodiment of the accent lighting system, which is configured for wireless connection to (communication with) the vehicle.

FIG. 9 illustrates an alternate embodiment of the disclosure in which the accent lighting system 1000 (e.g., the control module 300) may be controlled through the vehicle 10 via a wireless connection (e.g., Bluetooth® or the like), which may either replace or supplement operation via the switch 400 (FIG. 1).

With reference now to FIGS. 1-8, methods of installing and using the accent lighting system 1000 will be discussed.

Prior to insertion of the light module 100 into the cupholder(s) 14, the switch 400 (FIG. 1) is installed in an accessible location (e.g., in the console 12, the dashboard 20 (FIG. 9) of the vehicle 10, etc.). Either prior or subsequent thereto, the control module 300 is located within the vehicle 10 (e.g., beneath the console 12), and the transmitter 200 is connected to the control module 300 via the connector 208. Either prior or subsequent to connection of the control module 300 and the transmitter 200, the transmitter 200 is connected to the cupholder(s) 14 (e.g., via the adhesive member 160iii (FIGS. 3, 8)). More specifically, in the particular embodiment of the accent lighting system 1000 illustrated, the transmitter 200 is connected to a bottom surface 22 (FIG. 3) of the cupholder(s) 14 such that, upon insertion of the light module 100 into the cupholder(s) 14, the cupholder(s) 14 are positioned between the transmitter 200 and the light module 100 and, thus, between the respective inductive members 206, 106. As indicated above, use of the adhesive member 160iii allows the transmitter 200 to be connected to the cupholder(s) 14 without forming any openings or penetrations. The cupholder(s) 14 (e.g., the bottom surface 22 thereof) thus remains intact, continuous, and devoid of any openings, thereby avoiding the creation of any pathways for fluid (e.g., in the event of a spill).

Following connection of the transmitter 200 to the cupholder(s) 14, the light module 100 is inserted into the cupholder(s) 14 (e.g., via the tactile member 156 (FIGS. 3, 4)). During insertion of the light module 100, the location member(s) 126 (FIG. 7) engage (contact) the inner surface 18 (FIGS. 2, 3) of the cupholder(s) 14, which inhibits (if not entirely prevents) unintended movement of the light module 100 within the cupholder(s) 14. As indicated above, the absence of any fixed connection between the light module 100 and the cupholder(s) 14 eliminates (obviates) any need to create or form any penetrations in the cupholder(s) 14 and, thus, further avoids the creation of any pathways for fluid.

Upon activation of the accent lighting system 1000, current is delivered from the power source 500 to the transmitter 200 through the control module 300, thereby energizing the inductive member 206 (FIG. 8). As current flows through the inductive member 206, the resultant induced magnetic field creates current in the inductive member 106 (FIG. 4), which is transmitted to the light source(s) 130 via the PCBA 108. The light generated (emitted) by the light source(s) 130 fills the internal chamber 120 (FIGS. 4-6) and is collected and distributed by the diffuser 104 to thereby illuminate the light module 100 and the cupholder(s) 14.

As discussed above, during use of the accent lighting system 1000, the color of the light emitted from the light source(s) 130, the lighting cycles, lighting intervals, etc., can be varied via the switch 400 or via wireless communication between the vehicle 10 and the control module 300. More specifically, the control module 300 receives and processes signals received from the switch 400 and/or the vehicle 10 (e.g., via the processor(s) 302 (FIG. 1)) to thereby vary operation of the light module 100 and alter the overall appearance of the interior of the vehicle 10.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated and encompass variations on the order of 25% (e.g., to allow for manufacturing tolerances and/or deviations in design). For example, the term "generally parallel" should be understood as referring to configurations in with the pertinent components are oriented so as to define an angle therebetween that is equal to 180°±25% (e.g., an angle that lies within the range of (approximately) 135° to (approximately) 225°) and the term "generally orthogonal" should be understood as referring to configurations in with the pertinent components are oriented so as to define an angle therebetween that is equal to 90°±25% (e.g., an angle that lies within the range of (approximately) 67.5° to (approximately) 112.5°). The term "generally parallel" should thus be understood as referring to encompass configurations in which the pertinent components are arranged in parallel relation, and the term "generally orthogonal" should thus be understood as referring to encompass configurations in which the pertinent components are arranged in orthogonal relation.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An accent lighting system for a vehicle comprising:
a light module configured for insertion into a cupholder in the vehicle, the light module including:
a housing defining an internal chamber;
a first inductive coil located within the internal chamber;
a printed circuit board assembly including a plurality of light sources, the printed circuit board assembly being in electrical communication with the first inductive coil such that the first inductive coil delivers power to the plurality of light sources;
a diffuser extending along an outer perimeter of the housing and including one or more light-permeable materials so as to allow light emitted from the plurality of light sources to pass therethrough; and
a cover overlying the printed circuit board assembly;
a transmitter including a second inductive coil configured for electromagnetic communication with the first inductive coil such that the second inductive coil wirelessly delivers power to the first inductive coil, thereby obviating any need for penetrations in the cupholder to establish electrical communication between the transmitter and the light module so as to inhibit fluid leakage from the cupholder; and
a control module positioned between the transmitter and a power source in the vehicle such that power flows from the power source to the transmitter through the control module, whereby the first inductive coil and the second inductive coil create current in the light module via electromagnetic induction to thereby energize the plurality of light sources and illuminate the light module and the cupholder.

2. The accent lighting system recited in claim 1, wherein the housing includes a recess defining a shoulder configured to support the cover such that the diffuser is positioned radially outward thereof.

3. The accent lighting system recited in claim 1, wherein the plurality of light sources are secured to the printed circuit board assembly and are spaced radially inward from the diffuser to inhibit visual perception of the plurality of light sources.

4. The accent lighting system recited in claim 1, further comprising an adhesive member positioned between the housing and the printed circuit board assembly.

5. The accent lighting system recited in claim 4, wherein the adhesive member defines a receptacle configured to receive the first inductive coil such that the adhesive member inhibits relative movement between the housing, the first inductive coil, and the printed circuit board assembly.

6. An accent lighting system for a vehicle comprising:
a console comprising a cupholder;
a light module configured for insertion into the cupholder, the light module including:
a first inductive member; and
a diffuser extending along a periphery of the light module so as to collect and distribute light generated by the light module; and
a transmitter located externally of the cupholder and including a second inductive member configured for electromagnetic communication with the first inductive member so as to create current in the first inductive member and thereby power the light module.

7. The accent lighting system recited in claim 6, wherein the light module is configured for insertion into a cupholder in the vehicle.

8. The accent lighting system recited in claim 6, wherein the light module includes at least one light source in electrical communication with the first inductive member.

9. The accent lighting system recited in claim 8, wherein the at least one light source includes an array of LEDs.

10. The accent lighting system recited in claim 8, further comprising a printed circuit board assembly in electrical communication with the first inductive member, the printed circuit board assembly including the at least one light source.

11. The accent lighting system recited in claim 10, wherein the printed circuit board assembly overlies the first inductive member.

12. The accent lighting system recited in claim 10, further comprising an adhesive member defining a receptacle configured to receive the first inductive member such that the first inductive member is positioned within the adhesive member.

13. The accent lighting system recited in claim 12, further comprising a housing defining an internal chamber configured to receive the adhesive member, the first inductive member, the printed circuit board assembly, and the at least one light source.

14. The accent lighting system recited in claim 13, wherein the adhesive member is positioned between the housing and the printed circuit board assembly to inhibit relative movement between the housing, the first inductive member, the printed circuit board assembly, and the at least one light source.

15. The accent lighting system recited in claim 13, wherein the diffuser is a component of the housing.

16. The accent lighting system recited in claim 15, wherein the diffuser is formed integrally with the housing.

17. An accent lighting system for a vehicle comprising:
a console comprising a cupholder;
a light module configured for insertion into the cupholder;
a transmitter located externally of the cupholder and configured for wireless communication with the light module such that the transmitter is locatable externally of the cupholder, wherein the light module and the transmitter each include an inductive member such that, upon receiving power from a power source in the vehicle, the transmitter creates current in the light module via electromagnetic induction to thereby power the light module and illuminate the cupholder; and
a control module in electrical communication with the transmitter and the power source such that power flows from the power source to the transmitter through the control module, the control module being configured to communicate signals to the light module via the transmitter to vary operation of the light module.

18. The accent lighting system recited in claim 17, wherein the light module includes a diffuser defining an outer contour corresponding to an inner contour of the cupholder.

19. The accent lighting system recited in claim 18, wherein the diffuser extends about a periphery of the light module.

20. The accent lighting system recited in claim 18, wherein the light module includes at least one light source positioned radially inward of the diffuser, the diffuser including a light-permeable material such that the diffuser collects and distributes light generated by the at least one light source.

* * * * *